United States Patent [19]

Rametta

[11] 4,447,588
[45] May 8, 1984

[54] ANAEROBICALLY-CURING COMPOSITIONS

[75] Inventor: Anthony J. Rametta, White Bear Lake, Minn.

[73] Assignee: Minnesota Mining & Manufacturing Company, St. Paul, Minn.

[21] Appl. No.: 289,703

[22] Filed: Aug. 3, 1981

Related U.S. Application Data

[63] Continuation-in-part of Ser. No. 203,682, Nov. 3, 1980, abandoned.

[51] Int. Cl.$^3$ ............................................. C08F 20/20
[52] U.S. Cl. ..................................... 526/301; 526/204; 526/206; 526/309; 526/313; 526/317; 526/320; 526/323.1; 526/323.2
[58] Field of Search ................... 526/323.1, 323.2, 313, 526/309, 320, 317, 301, 89, 204, 205, 206, 214

[56] References Cited

U.S. PATENT DOCUMENTS

| | | | |
|---|---|---|---|
| 2,558,139 | 6/1951 | Knock et al. | 260/45.5 |
| 2,895,950 | 7/1959 | Krieble | 260/89.5 |
| 3,203,941 | 8/1965 | Krieble | 260/89.5 |
| 3,658,624 | 4/1972 | Lees | 156/332 |
| 3,775,385 | 11/1973 | Ozono et al. | 260/79 |
| 3,957,561 | 5/1976 | Skoultchi | 156/331 |
| 3,980,627 | 9/1976 | McDowell et al. | 526/328 |
| 3,987,037 | 10/1976 | Bonham et al. | 260/240 D |
| 3,992,275 | 11/1976 | Shahidi et al. | 204/159 |
| 4,040,923 | 8/1977 | Pacifici et al. | 204/159 |
| 4,043,887 | 8/1977 | Pacifici et al. | 204/159 |
| 4,052,244 | 10/1977 | Skoultchi | 156/310 |
| 4,081,308 | 3/1978 | Skoultchi | 156/310 |
| 4,239,609 | 12/1980 | Barzynski et al. | 204/159 |
| 4,239,850 | 12/1980 | Kita et al. | 204/159.18 |
| 4,285,755 | 8/1981 | Piestert et al. | |

FOREIGN PATENT DOCUMENTS 1241824 8/1971 United Kingdom .

OTHER PUBLICATIONS

"Vinyl Polymerizatioon by Metal Complexes," *Chemical Abstracts*, vol. 84, 84:17864s (1976).

*Primary Examiner*—Harry Wong, Jr.
*Attorney, Agent, or Firm*—Donald M. Sell; James A. Smith; Robert W. Sprague

[57] ABSTRACT

Anaerobically-curing compositions are described comprising (A) a polymerizable monomer; (B) a halogen-containing compound as a first initiator component; (C) an amine, organic sulfimide or perfluoroalkyl sulfonanilide as a second initiator component; and (D) an inhibitor of free-radical polymerization. These compositions are particularly suitable as adhesives and may be formulated as thread-locking adhesives or may be modified by the addition of various modifying polymers to obtain desired properties such as increased viscosities or pressure-sensitive properties.

14 Claims, No Drawings 4,447,588

ANAEROBICALLY-CURING COMPOSITIONS

CROSS-REFERENCE TO RELATED APPLICATION

This application is a continuation-in-part of copending U.S. application Ser. No. 203,682 which was filed on Nov. 3, 1980 and now abandoned.

BACKGROUND OF THE INVENTION

This invention relates to anaerobically-curing compositions.

Anaerobically-curing compositions generally comprise polymerizable acrylate monomers and free-radical initiators. When maintained in an oxygen-containing environment, such compositions remain uncured (i.e., unpolymerized). However, in the absence of oxygen, such as when an anaerobically-curing composition is placed between surfaces which are in close engagement with one another (e.g. a nut and bolt), cure will ensue.

Anaerobically-curing compositions containing peroxide or hydroperoxide initiators are well-known in the art, having been described in U.S. Pat. No. 2,895,950 (Krieble). Commonly such compositions contain quinonetype compounds which act as polymerization inhibitors, thereby maintaining the compositions in an uncured state when stored in the presence of oxygen.

Unfortunately, anaerobically-curing compositions which contain peroxide or hydroperoxide initiators may possess certain disadvantages. For example, there is often the possibility of explosion whenever large amounts of peroxy compounds are handled such as during manufacture of these compositions. Furthermore, unfortunately peroxy compounds typically decompose with time, thus resulting in a steadily decreasing ability of such compounds to initiate the polymerization of compositions containing them.

While one-part, anaerobically-curing compositions containing polymerization initiators other than peroxy compounds are known in the art, such compositions often fail to exhibit a suitable balance of shelf-life stability versus cure-rate. In particular, while such compositions may exhibit suitable shelf-life stability in the presence of oxygen, they may cure at unsatisfactory rates when oxygen is excluded. Alternatively, such compositions may often cure rapidly in the absence of oxygen, but may exhibit unsatisfactory shelf-lives.

BRIEF SUMMARY OF THE PRESENT INVENTION

The present invention provides novel anaerobically-curing compositions comprising (A) a polymerizable monomer having at least one α,β-unsaturated carboxyl functionality per molecule of monomer; (B) a halogen-containing compound as a first initiator component; (C) as a second initiator component a compound selected from the group consisting of amines, organic sulfimides, and perfluoroalkyl sulfonanilides; and (D) an inhibitor of free-radical polymerization.

The compositions of the present invention exhibit suitable shelf-life (e.g., at least about 4 weeks at 120° F.) when stored in the presence of oxygen and cure rapidly to form strong bonds in the absence of oxygen. Furthermore, the compositions of the present invention, since they do not contain peroxides or hydroperoxides, may be stored for extended periods of time without fear of initiator decomposition. Also, since the compositions of the present invention do not contain peroxides or hydroperoxides, there is no possibility of explosion during manufacturing of these compositions.

The compositions of the present invention are particularly suitable for bonding operations involving at least one active metal (e.g., copper and cold-rolled steel) and are further suitable for bonding relatively inactive metals (e.g., zinc and cadmium). The compositions are also suitable for bonding nonmetallic substrates (e.g., plastic, glass and wood) provided that appropriate primers are used to accelerate the cure to a useful rate.

The compositions of the present invention may be formulated as non-viscous, flowable liquids which are particularly useful in bonding operations involving well-mated surfaces (e.g., a nut and bolt). The compositions may also comprise various types of modifying polymers in order to obtain desired properties. For example, thermoplastic polymers or pressure-sensitive polymers may be added to the compositions of the present invention to obtain compositions which are useful in a variety of other bonding operations.

DETAILED DESCRIPTION OF THE PRESENT INVENTION

The anaerobic compositions of the present invention comprise 100 parts by weight of a polymerizable monomer (A) having at least one α,β-unsaturated carboxyl functionality (i.e.,

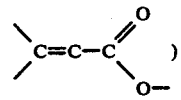

per molecule of monomer.

Suitable monomers for employment in the compositions of the present invention include the diacrylates and dimethacrylates described in U.S. Pat. No. 3,043,820 (Krieble), U.S. Pat. No. 3,457,212 (Fukuoka et al.), U.S. Pat. No. 3,923,737 (George et al.), and U.S. Pat. No. 3,944,521 (Bradley et al.), incorporated herein by reference. Other suitable polymerizable monomers include acrylate-terminated monomers such as the monomeric polyacrylate esters formed from organic polyisocyanates, such monomers being described, for example, in U.S. Pat. No. 3,425,988 (Gorman et al.), incorporated herein by reference. Particularly suitable polyfunctional acrylates and methacrylates include triethyleneglycol dimethacrylate, ethyleneglycol dimethacrylate, tetraethyleneglycol dimethacrylate, polyethyleneglycol, diacrylate, polyethyleneglycol dimethacrylate, 1,3-butyleneglycol dimethacrylate, trimethylol propane trimethacrylate, neopentylglycol dimethacrylate, ethoxylated bisphenol A dimethacrylate, propoxylated bisphenol C dimethacrylate and bisphenol A bis(2-hydroxypropyl)dimethacrylate.

Monoacrylates and monomethacrylates are also suitable for employment in the compositions of the present invention as the polymerizable monomer. Suitable monoacrylates and monomethacrylates include cyclohexyl methacrylate, 2-ethylhexyl methacrylate, hydroxyethyl methacrylate, isooctyl acrylates and n-butyl acrylate.

Methacrylic acid and similar α,β-unsaturated carboxylic acids are also suitable for employment as polymerizable monomers in the compositions of the present invention as are half-ester such as the 2-hydroxyethyl methacrylate half-ester of maleic acid. Other suitable half-esters include those described in U.S. Pat. No. 3,428,614 (Brownstein) and U.S. Pat. No. 4,080,238 (Wolinski et al.), incorporated herein by reference.

In order to enhance the shelf-life of the compositions of the present invention it may be desirable to remove metal ions, if such are present, from the polymerizable monomer. This may be particularly desirable in the event that commercially-obtained monomers, which often contain significant amounts of metal ions, are employed in these compositions. Removal of metal ions may be effected by means known to those skilled in the art.

The compositions of the present invention may comprise a single type of polymerizable monomer or may comprise a blend of two or more different polymerizable monomers.

Compositions of the present invention further comprise about 0.5 to 20 parts by weight and preferably 1 to 10 parts by weight of a halogen-containing compound (B) as a first initiator component per 100 parts by weight of the polymerizable monomer (A). Generally the halogen-containing compound should be of an electronic structure which facilitates free-radical formation. One such class of suitable halogen-containing compounds is defined by the following general formula (I):

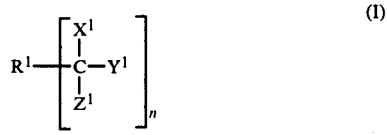

wherein:

$X^1$ is selected from the group consisting of H, CH$_3$, Cl, and Br;

$Y^1$ and $Z^1$ are each selected independently from the group consisting of Cl and Br;

$R^1$ is selected from the group consisting of aromatic and heteroaromatic residues; and n is an integer from 1 to 3 inclusive.

It is to be understood that the formula (I) may contain any substituent which does not adversely affect the compound for its intended use as an initiator component.

Examples of suitable halogen-containing compounds of the above formula (I) are α,α,α-trichlorotoluene, α,α,α,α',α',α'-hexachloro-p-xylene, α,α,α-tribromoquinaldine,

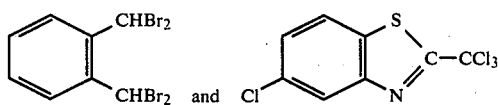

Preferred halogen-containing compounds of the above general formula (I) are further defined by the following formula (II):

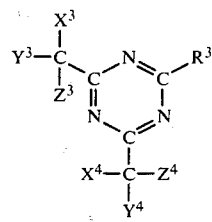

wherein:

$X^3$ and $X^4$ are each selected independently from the group consisting of H, CH$_3$, Cl, and Br;

$Y^3$, $Y^4$, $Z^3$ and $Z^4$ are each independently selected from the group consisting of Cl and Br; and $R^3$ is selected from the group consisting of H and organic radicals comprising 1 to about 10 carbons. Preferred organic radicals are alkyl, haloalkyl, alkylene and aromatic groups.

It is to be understood that $R^3$ of formula (II) may contain any substituent which does not adversely affect the compound for its intended use as an initiator component.

Suitable halogen-containing compounds of formula (II) include those described in U.S. Pat. No. 3,277,091 (Schmelzer et al.) and U.S. Pat. Nos. 3,954,475 and 3,987,037 (both to Bonham et al.), incorporated herein by reference. Examples of this preferred class are 2,4-Bis-(trichloromethyl)-6-methyl-s-triazine, 2,4,6-Tris-(trichloromethyl)-s-triazine, 2,4,6-Tris-(tribromomethyl)-s-triazine, and 2,4-Bis(trichloromethyl)-6-p-methoxystryryl-s-triazine, all prepared in accordance with the teachings of Wakabayashi et al., Bulletin of the Chemical Society of Japan, 42, 2924–30 (1969), an article referenced in said U.S. Pat. Nos. 3,954,475 and 3,987,037, and

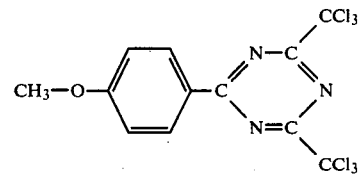

prepared in accordance with the teachings of said U.S. Pat. No. 3,277,091.

A second class of suitable halogen-containing compounds is defined by the following general formula (III):

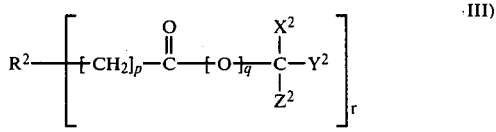

wherein:

$X^2$ is selected from the group consisting of H, Cl, Br and CN;

$Y^2$ and $Z^2$ are each selected independently from the group consisting of Cl and Br;

$R^2$ is selected from the group consisting of amino residues and organic radicals, preferably hydrocarbons, comprising 1 to about 10 carbons. Preferred hydrocarbon groups are alkyl groups and aryl groups;

p is 0 or 1;
q is 0 or 1; and
r is 1 or 2.

It is to be understood that $R^2$ of the formula (III) may contain any substituent which does not adversely affect the compound for its intended use as an initiator component.

Examples of suitable halogen-containing compounds of this general formula (III) are dibromocyanoacetamide, $CH_3CH_2CH(CH_2CO_2CBr_3)_2$, $CH_3CH_2CH(CH_2CO_2CBr_3)_2$,

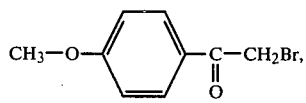

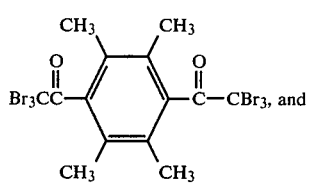

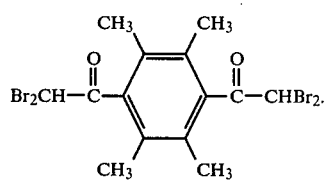

The compositions of the present invention may comprise a single type of halogen-containing compound or may comprise two or more different types of halogen-containing compounds.

Compositions of the present invention also comprise as a second initiator component (C) a compound selected from the group consisting of amines, organic sulfimides, and perfluoroalkyl sulfonanilides. The compositions of the present invention comprise about 0.5 to 20 parts by weight and preferably 1 to 10 parts by weight of the second initiator component per 100 parts by weight of the polymerizable monomer. Furthermore, it is preferred that the second initiator component be present in these compositions in amounts which are approximately stoichiometric to the halogen-containing compound (B).

Amines useful in the compositions of the present invention are secondary amines and tertiary amines. Suitable secondary amines are of the following formula (IV):

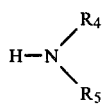

wherein: $R^4$ and $R^5$ are each organic radicals, preferably hydrocarbon groups, comprising 1 to about 12 carbons. It is to be understood that $R^4$ and $R^5$ of formula (IV) can be united to form a heterocyclic secondary amine.

Examples of suitable secondary amines of formula (IV) are N,N-diethylamine, N,N-diphenylamine and homopiperidene.

Suitable tertiary amines are of the following formula (V):

wherein: $R^6$, $R^7$ and $R^8$ are each organic radicals, preferably hydrocarbon groups, comprising 1 to about 12 carbons. It is to be understood that any two of $R^6$, $R^7$ and $R^8$ of formula (V) may be combined to form a heterocyclic tertiary amine.

Examples of suitable tertiary amines of the formula (V) are triethyl amine, tripropyl amine, tributyl amine, N,N-dimethyl cyclohexyl amine, N,N-dimethyl ethanol amine, and 2-aminopyridine.

Within formula (V) is the preferred class of tertiary amines, namely tertiary aromatic amines of the more specific formula (VI):

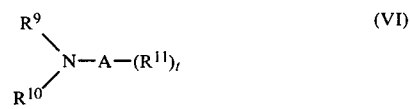

wherein:

$R^9$ and $R^{10}$ are each organic radicals, preferably hydrocarbon groups, comprising up to about 12 carbons;

A is a carbocyclic armoatic nucleus selected from the group consisting of phenyl and naphthyl radicals;

$R^{11}$ is an organic radical comprising up to about 5 carbons and is selected from the group consisting of alkyl and alkoxy radicals; and t is from 0 to 3 ; inclusive.

Examples of suitable tertiary aromatic amines of formula (VI) are N,N,diethyl-p-toluidine,-N,N-dimethylaniline, N,N-diethylaniline and N,N-bis-(2-hydroxyethyl)-p-toluidine. The preferred tertiary aromatic amine is N,N-dimethyl-p-toluidine.

Organic sulfimides (i.e., organic compounds containing the group

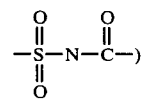

useful in the compositions of the present invention include those of the following general formula (VII):

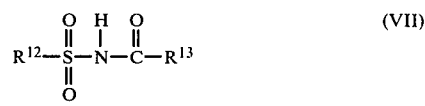

wherein: $R^{12}$ and $R^{13}$ are organic radicals, preferably hydrocarbon groups, containing up to about 10 carbons. It is to be understood that $R^{12}$ and $R^{13}$ of formula (VII) may contain any substituent which does not adversely affect the compound for its intended use as an initiator component. It is also to be understood that $R^{12}$ and $R^{13}$ of formula VII can be united to bond the sulfimide group in a heterocyclic or a polynuclear heterocyclic ring system.

A suitable organic sulfimide of formula (VII) is

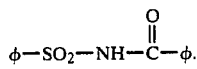

The preferred organic sulfimide of formula (VII) is O-benzoic sulfimide (i.e., saccharin).

Suitable perfluoroalkyl sulfonanilides for employment in the compositions of the present invention have been described in U.S. Pat. No. 4,005,141 (Moore et al) and U.S. Pat. No. 4,076,519 (Harrington et al), incorporated herein by reference, and include trifluoromethanesulfonanilide, 2-phenyltrifluoromethanesulfonanilide, and N-2-naphthyltrifluoromethylsulfonanilide, all prepared in a closed ractor as described generally in Method A of said U.S. Pat. No. 4,005,141, 4-trifluoromethyltrifluoromethanesulfonanilide, prepared as described in said U.S. Pat. No. 4,076,519; and 4-phenylthiotrifluoromethanesulfonanilide, prepared as described in said U.S. Pat. No. 4,005,141. Trifluoromethanesulfonanilide is the preferred perfluoroalkylsulfonanilide for employment in the compositions of the present invention.

The compositions of the present invention may comprise one or more types of amine, organic sulfimide or perfluoroalkylsulfonanilide or various combinations thereof.

When an amine is employed as the second initiator component in the compositions of the present invention, it may also be desirable to include up to about 0.5 parts by weight and preferably about 0.1 to 0.3 parts by weight of an organic thiol per 100 parts by weight of the monomer. Compositions comprising an amine and an organic thiol are described in copending application Ser. No. 289,702, filed of even date and commonly assigned, now U.S. Pat. No. 4,413,108, which is a continuation-in-part of application Ser. No. 203,683, filed on Nov. 3, 1980 and commonly assigned, both incorporated herein by reference.

A preferred thiol for employment in N,N-dimethyl-p-toluidine-containing compositions is dodecyl mercaptan.

In order to obtain compositions exhibiting suitable shelf-life, the compositions of the present invention also comprise a sufficient amount of an inhibitor of free-radical polymerization to retard polymerization of the compositions while in the presence of air. Preferred compositions of the present invention comprise about 0.0005 to 0.10 parts by weight and most preferably about 0.001 to 0.03 parts by weight of conventional quinone-type inhibitor (i.e., quinone and its derivatives)per 100 parts by weight of the polymerizable monomer (A). Preferred quinone-type inhibitors for employment in the composition of the present invention are hydroquinone, methylhydroquinone and benzoquinone. Other suitable quinone-type inhibitors are described in U.S.Pat. No. 4,166,169 (Patel et al.), incorporated herein by reference. Other types of inhibitors of free-radical polymerization which are well-known in the art may also be used in the compositions of the present invention.

Employment of a commercially-obtained polymerizable monomer, which generally will already contain a conventional quinone-type inhibitor (e.g., hydroquinone or methylhydroquinone), may introduce a sufficient amount of the inhibitor into the compositions of the present invention such that it may be unnecessary to separately add additional inhibitor.

Compositions comprising the aforementioned components (A), (B) and (C) generally exhibit low viscosity and are particulary useful for bonding well mated surfaces such as the threads of a nut and bolt. Fixturing of the surfaces involved in the bonding operation may be necessary when employing compositions comprising only components (A), (B), and (C) until sufficient bond strength has developed. Fixture time (i.e., the time required to develop a bond between surfaces which will withstand forces exerted with "hand strength") will typically be within less than about 1 hour at room temperture.

In many bonding applications, it may be desirable to achieve bonding characteristics not obtainable with compositions comprising only components (A), (B), and (C). Thus, the compositions of the present invention may furthercomprise up to about 950 parts by weight of various modifying polymers per 100 parts by weight of the polymerizable monomer (A). Modifying polymers which may be present in these compositions include polymers added to obtain desired viscosities. Other modifying polymers which may be present in these compositions include thermoplastic polymers and pressure-sensitive polymers, the latter also generally being thermoplastic in nature. Preferred modifying polymers are substantially nonreactive (i.e., will not generally be subject to free-radical-initiated polymerizatin under the anaerobic conditions typically used to cure the compositions of the present invention).

Polymers useful as modifying polymers for providing compositions exhibiting increased viscosity are well-known in the art and include cellulose acetate butyrates, polymethacrylates, phenoxy resins, polyesters and polyurethanes. A preferred modifying polymer for increasing viscosities of these compositions is "PKHA Resin" (a phenoxy resin commercially available from Union Carbide). A particularly suitable amount of the modifying polymers for providing compositions exhibiting increased viscosities is up to about 25 parts by weight per 100 parts by weight of the polymerizable monomer (A).

Thermoplastic polymers useful as modifying polymers in these compositions are well-known in the art and include those described in U.S. Pat. No. 3,996,308 (Douek et al.), incorporated herein by reference. Examples of particularly suitable thermoplastic polymers include polyvinyl acetates (e.g. that available under the trade designation "AYAT Resin" from Union Carbide), phenoxy resins (e.g., that available under the trade designation "PKHJ Resin" from Union Carbide), polyesters (e.g. that available under the trade designation "Vitel 207" from B.F. Goodrich), polyurethanes (e.g. that available under the trade designation "Estane 5712" from B.F. Goodrich), and nitrile rubbers (e.g., that available under the trade designation "Hycar 1072" from B. F. Goodrich).

Pressure-sensitive polymers useful as modifying polymers in these compositions include those described in U.S. Pat. No. Re. 24,906 (Ulrich) and U.S. Pat. No. 4,113,792 (Pastor et al.), both incorporated herein by reference. Examples of particularly suitable pressure-sensitive polymers include copolymers of isooctyl acrylate and acrylic acid, copolymers of isobutyl acrylate and acrylic acid and copolymers of n-butyl acrylate and acrylic acid, these copolymers preferably containing about 90% by weight of the respective alkyl acrylate and about 10% by weight of acrylic acid. Another suitable polymer is the terpolymer containing isobutyl acrylate, n-butyl acrylate and acrylic acid residues.

A particularly suitable amount of thermoplastic or pressure-sensitive modifying polymers for employment in the compositions of the present invention is from about 25 to 500 parts by weight per 100 parts by weight of the polymerizable monomer (A).

Compositions of the present invention which comprise the various modifying polymers discussed above may further comprise the various tackifiers, plasticizers and the like which are well known in the art in order to obtain desired properties.

Compositions comprising modifying polymers may be conveniently applied to surfaces as viscous neat liquids, sheets, films, tapes and the like, or as solutions in suitable organic solvents. Depending on the type of modifying polymer employed in the composition, fixturing of the surfaces involved in the bonding operation may or may not be necessary.

It is understood that the compositions of the present invention may also comprise various other ingredients such as fillers, thickening agents, and the like which are well-known in the art.

It is also understood that the compositions of the present invention may be formulated as two-part compositions with at least one part comprising as a major constituent a polymerizable monomer and with one part comprising the first initiator component (i.e., a halogen-containing compound) and the other part comprising the second initiator component (i.e., an amine, an organic sulfimide or a perfluoroalkyl sulfonanilide). If only one part comprises a polymerizable monomer, the monomer-less part may comprise the respective initiator component combined with a suitable vehicle such as a volatile organic solvent. Alternatively, if that initiator component is a neat liquid, it can be employed simply as such.

When the compositions of the present invention are employed in bonding operations involving at least one active metal surface (e.g., copper and cold-rolled steel), cure will rapidly ensue at room temperature in the absence of oxygen. However, it is known that anaerobically-curing compositions, including those of the present invention, may cure only very slowly, if at all, when no active metal surfaces are involved in the bonding operation. Thus when the compositions of the present invention are to be employed in bonding operations involving relatively inactive metals (e.g., cadmium and zinc) or nonmetal substrates (e.g., plastic, glass and wood) or combinations thereof, it is often desirable or perhaps even necessary to employ an appropriate activator which is preapplied to at least one of the surfaces to be bonded. Such an activator can, of course, be employed to further accelerate cure when active metal surfaces are involved in the bonding operation.

Paticularly suitable activators include compounds containing transition metal ions, examples of such activators including iron acetylacetonate, vanadium acetylacetonate, and copper octoate. A preferred activator of this type is copper acetylacetonate. It may be desirable to employ an activator having the metal ion in a higher versus lower oxidation state. Other particularly suitable activators are condensation reaction products of an aldehyde and a primary or secondary amine, such products being described n U.S. Pat. No. 3,616,040 (Toback), incorporated herein by reference. A preferred activator of this latter type is a condensation reaction product of butyraldehyde and aniline (e.g., that commercially available under the trade designation "Vanax 808" from R. T. Vanderbilt Chemical Company).

The activator may be applied to a substrate by means of a suitable vehicle. For example, the activator may be applied as a solution in a volatile organic solvent. A volatile organic solvent is desirable as a vehicle for the activator in order to insure rapid evaporation of the solvent and to thus reduce the possibility of entrapment of solvent between the surfaces being bonded as the bonding operation proceeds. A preferred solvent for use in the present invention is methylene chloride. Activators which are liquids or solids at the temperature at which the bonding operatin is conducted may be applied directly to a substrate without dissolution in a vehicle.

In the following examples which will serve to illustrate the present invention all parts are parts by weight and all percentages are percentages by weight, unless otherwise indicated.

TEST METHODS

Accelerated Shelf-life Stability—Test Method A

In testing the accelerated stability of a composition, a 500 cc polyethylene bottle is filled with approximately 250cc of the composition and the bottle is then sealed with a screw cap. The bottle and contents are stored at 120° F. (49° C.) for 28 days, after which time the contents are examined for polymerization and for curability.

Overlap Shear—Test Method B

In testing the performance of a composition, 3 to 4 drops (about 0.15 to 0.20 cc) of the composition is applied to an etched aluminum strip which in turn is brought into contact with a second etched aluminum strip such that the area of adhesive bonding between the two strips measures 1-inch$^2$ (6.45 cm$^2$). The etched aluminum strips have previously been primed with a 1% solution (w/w) of copper (II) acetylacetonate in methylene chloride. The handling time (i.e., the time at which the two strips could no longer be pulled apart with gentle hand pressure) is measured in hours. The bond is then allowed to condition for 3 days at room temperature, at which time overlap shear value (given in pounds per square inch) is determined using an Instron Dynamic tester with a jaw separation rate of 0.2 inch (0.51 cm) per minute.

Thread Locking—Test Method C

In testing the performance of a composition, one drop (about 0.05 cc) of the composition is applied to the threads of a cleaned ⅜ inch (0.95 cm) No. 16, grade 5, plain finished steel bolt to which a mating nut is subsequently applied. The fixture time (i.e., the time at which the nut could no longer be unscrewed from the bolt using hand strength only) is determined at room temperture. The nut and bolt assembly is then allowed to condition for 24 hours at room temperature and break away torque and prevailing off torque values are subsequently measured (both given in inch/pounds).

EXAMPLE 1

A suitable anaerobically-curing composition in accordance with the present invention is prepared using the following ingredients combined in the order indicated:

| | Parts by Weight |
|---|---|
| Tetraethyleneglycol dimethacrylate (available under trade designation "SR-205" | 100 |

-continued

|  | Parts by Weight |
|---|---|
| from Sartomer Co.) | |
| 2,4-Bis-(trichloromethyl)-6-methyl-s-triazine (described in U.S. Pat. No. 3,987,037 (Bonham et al.)) | 2 |
| N,N—dimethyl-p-toluidine | 2 |
| Methylhydroquinone | 0.01 |

When the above composition is tested in accordance with Test Method A, no gelation is observed at 28 days.

When the above composition is tested in accordance with Test Method B, the handling time is less than about 1 hour and the overlap shear value is about 180 pounds per square inch (12.6 kg/cm$^2$).

EXAMPLE 2

Another suitable one-pat anaerobically-curing composition in accordance with the present invention is prepared using the following ingredients combined in the order indicated:

|  | Parts by Weight |
|---|---|
| Tetraethyleneglycol dimethacrylate | 100 |
| 2,4-Bis(trichloromethyl)-6-methyl-2-triazine | 3 |
| o-benzoic sulfimide | 1.6 |
| Methylhydroquinone | 0.05 |

When the above composition is tested in accordance with Test Method A, no gelation is observed at 28 days.

When the above composition is tested in accordance with Test Method B, the handling time is less than about 1 hour.

When the above composition is tested in accordance with Test Method C, the fixture time is less than about 1 hour, the breakaway torque is about 90 inch/pounds (612 cm/kg) and the prevailing off torque is about 200 inch/pounds (1360 cm/kg).

EXAMPLE 3

Another suitable anaerobically-curing composition in accordance with the present invention is prepared using the following ingredients combined in the order indicated:

|  | Parts by Weight |
|---|---|
| Tetraethyleneglycol dimethacrylate | 100 |
| 2,4-Bis-(trichloromethyl)-6-methyl-s-triazine | 3 |
| Trifluoromethanesulfonanilide | 3 |
| Methylhydroquinone | 0.01 |

The above composition exhibits a suitable shelf-life when stored in the presence of oxygen and cures rapidly when applied to an active metal surface once oxygen is excluded.

EXAMPLE 4

In illustrating another halogen-containing compound which can be suitably employed in the anaerobically-curing compositions of the present invention, a composition is prepared using the following ingredients which are combined in the order indicated.

|  | Parts by Weight |
|---|---|
| Tetraethyleneglycol dimethacrylate | 100 |
| 2,4,6-Tris-(tribromomethyl)-s-triazine | 2 |
| N,N—dimethyl-p-toluidine | 2 |
| Methylhydroquinone | 0.01 |

The above composition exhibits a suitable shelf-life when stored in the presence of oxygen and cures rapidly when applied to an active metal surface once oxygen is excluded.

When the above composition is tested in accordance with Test Method B, the handling time is less than about 2 hours and the overlap shear is 200 pounds per square inch (14.1 kg/cm$^2$).

EXAMPLE 5

In illustrating yet another halogen-containing compound which can be suitably employed in the anaerobically-curing composition of the present invention, a composition is prepared using the following ingredients which are combined in the order indicated:

|  | Parts by Weight |
|---|---|
| Tetraethyleneglycol dimethacrylate | 100 |
| 2,4-bis(trichloromethyl)-6-p-methoxystyryl-s-triazine (described in U.S. Pat. No. 3,987,037 (Bonham et al.)) | 2 |
| N,N—dimethyl-p-toluidine | 2 |
| Methylhydroquinione | 0.01 |

The above composition exhibits a suitable shelf-life when stored in the presence of oxygen and cures rapidly when applied to an active metal surface once oxygen is excluded.

When the above composition is tested in accordance with Test Method B, the handling time is less than about 2 hours and the handling time is less than about 2 hours and the overlap shear value is 200 pounds per square inch (14.1 kgcm$^2$).

EXAMPLE 6

In illustrating yet another halogen-containing compound which can be suitably employed in the anaerobically-curing composition of the present invention, a composition is prepared using the following ingredients which are combined in the order indicated:

|  | Parts by Weight |
|---|---|
| Tetraethyleneglycol dimethacrylate | 100 |
| 2,4-Bis-(trichloromethyl)-6-methyl-s-triazine | 2 |
| Homopiperidine (available from Aldrich Chemical) | 2 |
| Methylhydroquinone | 0.01 |

The above composition exhibits a suitable shelf-life when stored in the presence of oxygen and cures rapidly when applied to an active metal surface once oxygen is excluded.

When the above composition is tested in accordance with Test Method B, the handling time is less than about 2 hours.

EXAMPLE 7

In illustrating yet another halogen-containing compound which can be suitably employed in the anaerobically-curing composition of the present invention, a composition is prepared using the following ingredients which are combined in the order indicated:

|  | Parts by Weight |
| --- | --- |
| Tetraethyleneglycol dimethacrylate | 100 |
| α,α,α-Trichlorotoluene | 2 |
| N,N—dimethyl-p-toluidine | 2 |
| Methylhydroquinone | 0.01 |

The above composition exhibits a suitable shelf-life when stored in the presence of oxygen and cures rapidly when applied to an active metal surface once oxygen is excluded.

When the above composition is tested in accordance with Test method B, the handling time is less than about 2 hours and the overlap shear value is about 180 pounds per square inch (12.7 kg/cm$^2$).

EXAMPLE 8

In illustrating yet another halogen-containing compound which can be suitably employed in the anaerobically-curing compositions of the present invention, a composition is prepared using the following ingredients which are combined in the order indicated:

|  | Parts by Weight |
| --- | --- |
| Tetraethyleneglycol dimethacrylate | 100 |
| Dibromocyanoacetamide | 2 |
| N,N—dimethyl-p-toluidine | 2 |
| Methylhydroquinone | 0.01 |

The above composition exhibits a suitable shelf-life when stored in the presence of oxygen and cures rapidly when applied to an active metal surface once oxygen is excluded.

When the above composition is tested in accordance with Test Method B, the handling time is less than about 2 hours and the overlap shear value is about 200 pounds per square inch (14.1 kg/cm$^2$).

EXAMPLE 9

A suitable anaearobically-curing composition which is in accordance with the present invention and which comprises a pressure-sensitive polymer is prepared from the following ingredients:

|  | Parts by Weight |
| --- | --- |
| Isobutyl acrylate (90% by weight)/acrylic acid (10% by weight) copolymer (prepared in accordance with the procedures of in U.S. Pat. No. Re. 24,906 (Ulrich), incorporated herein by reference) | 7.0 |
| "Epocryl 12" (a reaction product of methacrylic acid and an epoxy resin; available from Shell Chemical Co.) | 2 |
| Methacrylic acid | 2 |
| 2,4-Bis-(trichloromethyl)-6-methyl-s-triazine | 0.3 |
| Homopiperidine | 0.3 |
| Benzoquinone | 0.005 |
| Methyl ethyl ketone | 7.6 |

When the above composition is tested in accordance with Test Method B except that here a jaw separation rate of 1 inch (2.54 cm) per minute is employed and the aluminum strips are unetched and have been wiped with methyl ethyl ketone prior to priming, the overlap shear value is about 1000 pounds per square inch (70.3 kg/cm$^2$).

EXAMPLE 10

Another suitable anaerobically-curing composition which is in accordance with the present invention and which comprises a pressure-sensitive polymer is prepared from the following ingredients:

|  | Parts by Weight |
| --- | --- |
| Isobutyl acrylate (85)/n-butylacrylate (10)/acrylic acid (5) terpolymer (prepared in accordance with the procedures of said U.S. Pat. No. Re. 24,906) | 14.4 |
| Tetraethylene glycol dimethacrylate | 3.0 |
| Methacrylic acid | 3.0 |
| α,α,α,α',α',α',-hexachloro-p-xylene | 0.3 |
| Saccharin | 0.8 |
| Methyl hydroquinone | 0.043 |
| Methyl ethyl ketone | 46.6 |

In testing the performance of this composition, 4"×6"(10cm ×15.2 cm) aluminum panels were primed with a 3% (weight to weight) solution of "Vanax 808" (condensation reaction product of butylaldehyde and aniline, commercially available from R. T. Vanderbilt Chemical Company). After the solvent evaporated, a 8-mil (0.2 mm) coating of the above adhesive composition was applied to one of the primed aluminum panels. After 30 minutes the second primed aluminum panel was placed over the first to give a one square inch area of adhesive bonding. The bond was allowed to condition 24 hours at room temperature, at which time one inch strips of the laminate were cut. The overlap shear valve was then determined to be about 800 pounds per square inch using an Instron Dynamic Tester operated at 0.2 inch (0.51 cm) per minute.

I claim:
1. An anaerobically-curing composition, comprising
   (A) a polymerizable monomer having at least one α,β-saturated carboxyl functionality per molecule of monomer;
   (B) an effective amount of halogen-containing compound as a first initiator component and selected from the group consisting of halogenated triazines of the formula

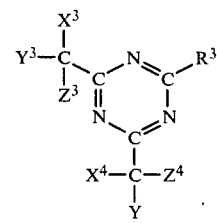

wherein: $X^3$ and $X^4$ are each selected independently from the group consisting of H, $CH_3$, Cl, and Br; $Y^3$, $Y^4$, $Z^3$ and $Z^4$ are each independently selected from the group consisting of Cl and Br; and $R^3$ is selected from the group consisting of H and organic radicals comprising 1 to about 10 carbons; and compounds of the formula

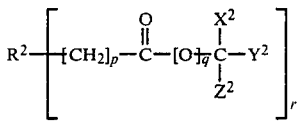

wherein:

$X^2$ is selected from the group consisting of H, Cl, Br and CN;

$Y^2$ and $Z^2$ are each selected independently from the group consisting of Cl and Br;

$R^2$ is selected from the group consisting of amino residues and organic radicals comprising 1 to about 10 carbons;

p is 0 or 1;

q is 0 or 1; and r is 1 or 2;

(C) an effective amount of second initiator component selected from organic sulfimides, perfluoroalkyl sulfonanilides, secondary amines of the formula

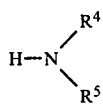

wherein: $R^4$ and $R^5$ are each hydrocarbon groups comprising 1 to about 12 carbons; tertiary amines of the formula

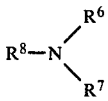

wherein: $R^6$, $R^7$ and $R^8$ are in each hydrocarbon groups comprising 1 to about 12 carbons; and tertiary amines of the formula

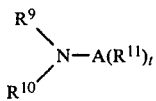

wherein:

$R^9$ and $R^{10}$ are each hydrocarbon groups comprising up to about 12 carbons;

A is a carbocyclic aromatic nucleus selected from the group consisting of phenyl and naphthyl radicals;

$R^{11}$ is an organic radical group comprising up to about 5 carbons and is selected from the group consisting of alkyl and alkoxy radicals; and t is from 0 to 3 inclusive;

(D) a sufficient amount of an inhibitor of free-radical polymerization to retard polymerization of said adhesive composition while in the presence of air; said composition being capable of polymerizing when placed in an anaerobically-curable environment.

2. An anaerobically-curing composition in accordance with claim 1, wherein said monomer is present in an amount of 100 parts by weight, said first initiator component is present in an amount of about 0.5 to 20 parts by weight, and said second initiator component is present in an amount of about 0.5 to 20 parts by weight.

3. An anaerobically-curing composition in accordance with claim 2, wherein said monomer is selected from the group consisting of triethyleneglycol dimethacrylate, ethyleneglycol dimethacrylate, tetraethyleneglycol dimethacrylate, polyethyleneglycol dimethacrylate, polyethylene glycol diacrylate, 1,3-butyleneglycol dimethacrylate, trimethylol propane trimethacrylate, neopentylglycol dimethacrylate, ethoxylated bisphenol A dimethacrylate, propoxylated bisphenol C dimethacrylate, bisphenol A bis(2-hydroxypropyl) dimethacrylate, cyclohexyl methacrylate, 2-ethylhexyl methacrylate, hydroxyethyl methacrylate, isooctyl acrylate, n-butyl acrylate, methacrylic acid, the 2-hydroxyethyl methacrylate half-ester of maleic acid, and monomeric polyacrylate esters formed from isocyanates.

4. An anaerobically-curing composition in accordance with claim 2, wherein said first initiator component is said halogenated triazine.

5. A composition in accordance with claim 4, wherein said halogen-containing compound is selected from the group consisting of 2,4-bis-(trichloromethyl)-6-methyl-s-triazine, 2,4,6-tris-(trichloromethyl)-s-triazine, 2,4,6-tris-(tribromomethyl)-s-triazine, 2,4-bis-(trichloromethyl)-6-p-methoxystyryl-s-triazine and

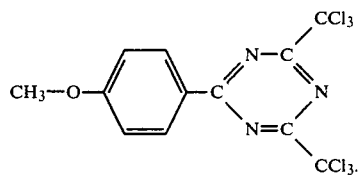

6. An anaerobically-curing composition in accordance with claim 4, wherein said second initiator component is an organic sulfimide of the formula

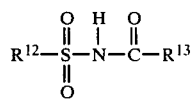

wherein: $R^{12}$ and $R^{13}$ are organic radicals comprising up to about 10 carbons.

7. An anaerobically-curing composition in accordance with claim 4, wherein said second initiator component is a perfluoroalkyl sulfonanilide.

8. An anaerobically-curing composition in accordance with claim 4, wherein said second initiator component is a tertiary amine selected from the group consisting of N,N-diethyl-p-toluidine, N,N-dimethylaniline, N,N-diethylaniline, and N,N-dimethyl-p-toluidine.

9. An anaerobically-curing composition in accordance with claim 4, wherein said first initiator component is present in an amount of 1 to 10 parts by weight and said second initiator component is present in an amount of 1 to 10 parts by weight.

10. An anaerobically-curing composition in accordance with claim 1, wherein said inhibitor is a quinone-type inhibitor which is present in an amount of about 0.001 to 0.03 parts by weight.

11. An anaerobically-curing composition comprising:
(A) a polymerizable monomer having at least one $\alpha,\beta$-saturated carboxyl functionality per molecule of monomer;
(B) an effective amount of halogen-containing compound as a first initiator component and selected from compounds of the formula

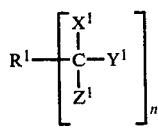

wherein:
$X^1$ is selected from the group consisting of H, $CH_3$, Cl and Br;
$Y^1$ and $Z^1$ are each selected independently from the group consisting of Cl and Br;
$R^1$ is selected from the group consisting of aromatic and heteroaromatic residues; and n is an integer from 1 to 3 inclusive;
(C) an effective amount of a second initiator component selected from compounds of the group consisting of organic sulfimides and perfluoroalkyl sulfonanilides;
(D) a sufficient amount of an inhibitor of free-radical polymerization to retard polymerization of said composition while in the presence of air;
said composition being capable of polymerizing when placed in an anaerobically-curable environment.

12. An anaerobically-curing composition in accordance with claim 11, wherein said monomer is present in an amount of 100 parts by weight, said first initiator component is present in an amount of about 0.5 to 20 parts by weight, and said second initiator component is present in an amount of about 0.5 to 20 parts by weight.

13. An anaerobically-curing composition in accordance with claim 11, wherein said second initiator component is an organic sulfimide of the formula

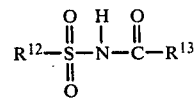

wherein: R12 and R13 are organic radicals comprising up to about 10 carbons.

14. An anaerobically-curing composition in accordance with claim 11, wherein said second initiator component is a perfluoroalkyl sulfonanilide.

* * * * *